US009288175B2

(12) United States Patent
Eisenberg et al.

(10) Patent No.: US 9,288,175 B2
(45) Date of Patent: Mar. 15, 2016

(54) EXTENDING A CONVERSATION ACROSS APPLICATIONS

(75) Inventors: Kobi Eisenberg, Yehud (IL); Ahi Gvirtsman, Tel-Aviv (IL); Boris Korenfeld, Rishon Le-Tzion (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 145 days.

(21) Appl. No.: 14/345,713

(22) PCT Filed: Sep. 30, 2011

(86) PCT No.: PCT/US2011/054332
§ 371 (c)(1),
(2), (4) Date: Mar. 19, 2014

(87) PCT Pub. No.: WO2013/048456
PCT Pub. Date: Apr. 4, 2013

(65) Prior Publication Data
US 2014/0244774 A1    Aug. 28, 2014

(51) Int. Cl.
| G06F 15/16 | (2006.01) |
| H04L 12/58 | (2006.01) |
| G06F 3/048 | (2013.01) |
| G06Q 30/02 | (2012.01) |
| H04L 12/18 | (2006.01) |

(52) U.S. Cl.
CPC ............... H04L 51/36 (2013.01); G06F 3/048 (2013.01); G06Q 30/02 (2013.01); H04L 12/1818 (2013.01); H04L 51/16 (2013.01); G06F 2203/04803 (2013.01); H04L 12/1831 (2013.01)

(58) Field of Classification Search
CPC ...... H04L 51/16; H04L 12/1831; G06F 3/048
See application file for complete search history.

(56) References Cited

U.S. PATENT DOCUMENTS

| 7,165,060 | B2 * | 1/2007 | Foster ................... G06Q 10/10 |
| 7,278,107 | B2 * | 10/2007 | Price ................... H04L 12/1813 715/209 |
| 7,437,408 | B2 * | 10/2008 | Schwartz ............ H04L 63/0245 709/204 |
| 7,809,791 | B2 * | 10/2010 | Schwartz ............ H04L 63/0245 709/203 |
| 7,870,193 | B2 * | 1/2011 | Hintermeister ........ G06Q 10/10 709/204 |
| 8,661,355 | B1 * | 2/2014 | Liu ....................... G06F 3/0481 715/759 |
| 8,676,735 | B1 * | 3/2014 | Heidenreich ............ G06N 5/02 706/45 |

(Continued)

FOREIGN PATENT DOCUMENTS

WO    WO2008011629 A2    1/2008
WO    WO2011055013 A1    5/2011

OTHER PUBLICATIONS

Extended European Search Report Received in EP Application No. 11873379.9 , Apr. 10, 2015, 7 pgs.
Alcatel-Lucent, Coliaborative Conversations, The new paradigm of enterprise communications, Strategic White Paper, 2011, 6 pages http://enterprise.alcatel-lucent.com/private/active_docs/WP_Collaborative%20Conversations.pdf.

(Continued)

Primary Examiner — Moustafa M Meky
(74) Attorney, Agent, or Firm — Hewlett Packard Enterprise Patent Department

(57) ABSTRACT

A method for extending a conversation across applications includes providing a conversation repository for storing a plurality of conversations for a plurality of applications. A conversation in the conversation repository is identified as having a context that is relevant to a first application object of a first application of the plurality of applications in response to a conversation call from a second application of the plurality of applications. A user interface is caused to display the identified conversation.

15 Claims, 9 Drawing Sheets

(56) References Cited

U.S. PATENT DOCUMENTS

| | | | |
|---|---|---|---|
| 9,063,990 B2* | 6/2015 | Buchheit | G06Q 10/107 |
| 2003/0101065 A1 | 5/2003 | Rohall et al. | |
| 2005/0193074 A1 | 9/2005 | Garland | |
| 2005/0223057 A1 | 10/2005 | Buchheit et al. | |
| 2008/0126480 A1* | 5/2008 | Hintermeister | G06Q 10/10 709/204 |
| 2008/0275701 A1* | 11/2008 | Wu | G06F 17/30017 704/235 |
| 2009/0094674 A1* | 4/2009 | Schwartz | H04L 63/0245 726/1 |
| 2010/0223190 A1 | 9/2010 | Pedersen et al. | |

OTHER PUBLICATIONS

Radiant Logic, Deliver Context-Aware Services-Enhance Productivity and Profitability with Context-Aware Applications, 1 page < http://www.radiantlogic.com/solutions/context-aware-solutions/deliver-context-aware-services/.

Radiant Logic, Enhance Productivity and Profitability with Context-aware Applications, 2 pages http://enterprise.alcatel-lucent.com/private/active_docs/WP_Collaborative%20Conversations.pdf.

* cited by examiner

IT Incident Manager - Application Interface

| incident ID | status | title | object data |
|---|---|---|---|
| 0001 | closed | asdf1234 | miscellaneous data 1 |
| 0002 | in progress | rrdpdkkgit | URGENT |
| 0003 | open | gkiidyu557 | miscellaneous data 3 |
| 0004 | accepted | 54flsjfu8 | miscellaneous data 4 |

— 12
— 14
— 10 cancel | previous | next | save | close | collaborate — 16 incident ID: 0002
status: in progress
location:
title:
description:

owner: Kobi
category:
impact:

IT Defect Manager - Application Interface — 36

| defect ID | owner | description | indident ID |
|---|---|---|---|
| 0006 | lthai | no contacts suggested | |
| 0011 | lthai | login fails | 0002 |

— 38

[description] [collaborate] [attach] [links] [history]

— 40

Summary: login fails

Description
login fails periodically

Comments

[add comment]

— 34

EXTENDING A CONVERSATION ACROSS APPLICATIONS

BACKGROUND

Tools such as e-mail and chat enable participants to engage in conversations and collaborate on a variety of issues. The context of such conversations is discerned by the participants reading the conversation. Initially, the context may be defined by a subject line. As an e-mail or chat thread grows with static files being added as attachments, the current topic of discussion can change over time. As a result, new and existing participants can find it cumbersome to discern the current context making it more difficult to take actions called for by the conversation.

DRAWINGS

FIGS. 1-5 depict screen views of various user interfaces.

DETAILED DESCRIPTION

Introduction

Figure 2:
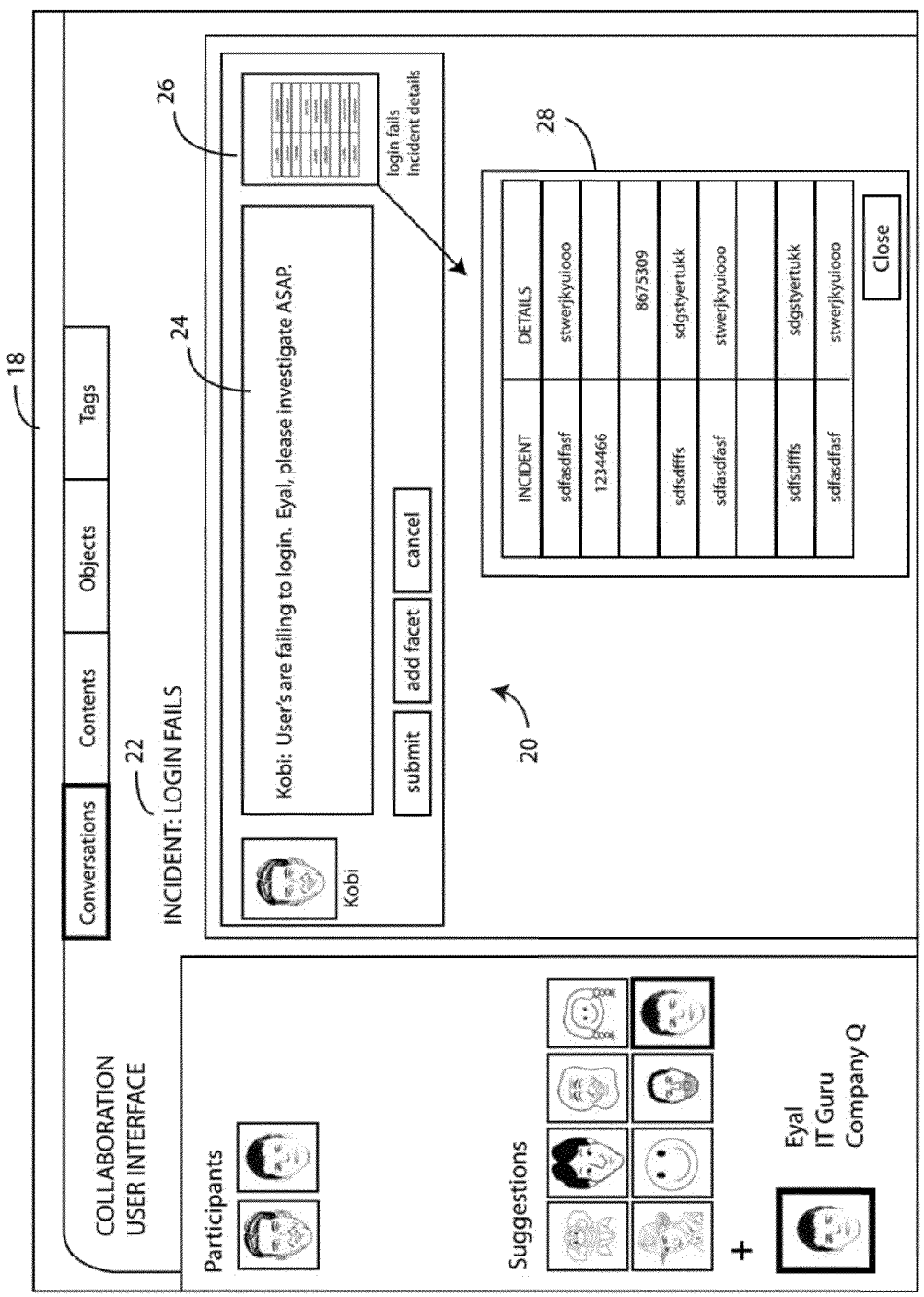

It is often the case that enterprise software applications, especially in IT organizations, are complex and cumbersome. The applications can require significant training and know-how for users to extract relevant information or perform specific actions of a given workflow. This is especially true where a workflow extends across applications and organizational silos. The information that a user consumes and the actions that are performed are often dynamic and defined by the context of that workflow. Before an action is taken, a user may collaborate with others to obtain perspective, guidance, or even permission.

Conversations detailing the collaboration on an issue remain within a given silo even though the workflow does not. In other words, within an organization, a first team may collaborate on an issue in the context of a first application. Later, that or a related issue may be collaborated on by a second team in the context of a second application. The second team, however, does not have access to the collaboration of the first which could prove quite useful in reaching a resolution. To elaborate, organizations, IT and otherwise, are often segmented into silos. In an IT organization, for example, the silos can include operations and applications. When an incident is being investigated by an operations team, it may be resolved completely, or that incident may translate into a defect to be addressed by a developer in the applications team. Following a conventional approach, the application developer is presented only with information available in a defect management application used by the applications team.

Embodiments described below allow a conversation that took place in the context of one application to continue in the context of a second application. An example of extending conversation context across applications includes providing a conversation repository for storing a plurality of conversations for a plurality of applications. In response to a conversation call from a second application of that plurality, a conversation in the repository is identified as having a context that is relevant to a first application object of a first application of the plurality. A user interface is caused to display the identified conversation.

As used, herein, a conversation is an electronic interaction between two or more participants concerning a particular topic or topics. The topic or topics relate to application objects that are managed in various applications. Overtime, a conversation can grow to include a sequence of posts as well as facets of those application objects. A conversation call is a request for an interface via which an a conversation may be initiated or continued. As is discussed in more detail below, a conversation call can include data for use in defining a context of a new conversation or for identifying an existing conversation. An application object is an entity managed or otherwise controlled by an application. For example, a given IT application may manage infrastructure changes. An object for that application may then correspond to a particular infrastructure change or group of changes. Other IT applications may manage incidents and defects. Objects for those applications may correspond to particular incidents and defects. In a different field of endeavor, an application may manage. An object for that application may then correspond to a particular patent or patent family.

As alluded to, each object can have various facets. A facet is information associated with the object obtained from an application managing the corresponding object. A facet, when displayed, conveys information relevant to the object and thus, provides application context to the conversation. As objects may be managed across multiple applications, different facets of a given object can include information from different source applications. A source application is an application capable of providing a facet or facets for any number of objects. Causing a user interface to display a facet can include directly generating or updating the user interface. It can also include communicating data with at least implicit instructions that the data be used to generate or update the user interface to display the facet.

A conversation can be stored electronically and updated overtime to add posts from various participants and facets of various application objects. Different instances of the conversation exist over time as the conversation is updated. At any given time, a user interface can be caused to display a given instance of the conversation. In an example, a stored conversation may be associated with and include facets from one or more application objects. Such association may be accomplished though identifiers for the application objects. The identifiers can be stored with or otherwise linked to the conversation. To extend a conversation across applications, an application object identifier of a first application may be passed to an object of a second application. That identifier may be associated with a particular conversation held in the context of the first application. The second application can use the identifier to access the conversation so that it may be updated in the context of that second application.

The following description is broken into sections. The first, labeled "Illustrative Example," presents an example in which a conversation is extended across applications. The second section, labeled "Environment," describes an environment in which various embodiments may be implemented. The third section, labeled "Components," describes examples of various physical and logical components for implementing various embodiments. The fourth section, labeled as "Operation," describes steps taken to implement various embodiments.

Illustrative Example

Figure 3:
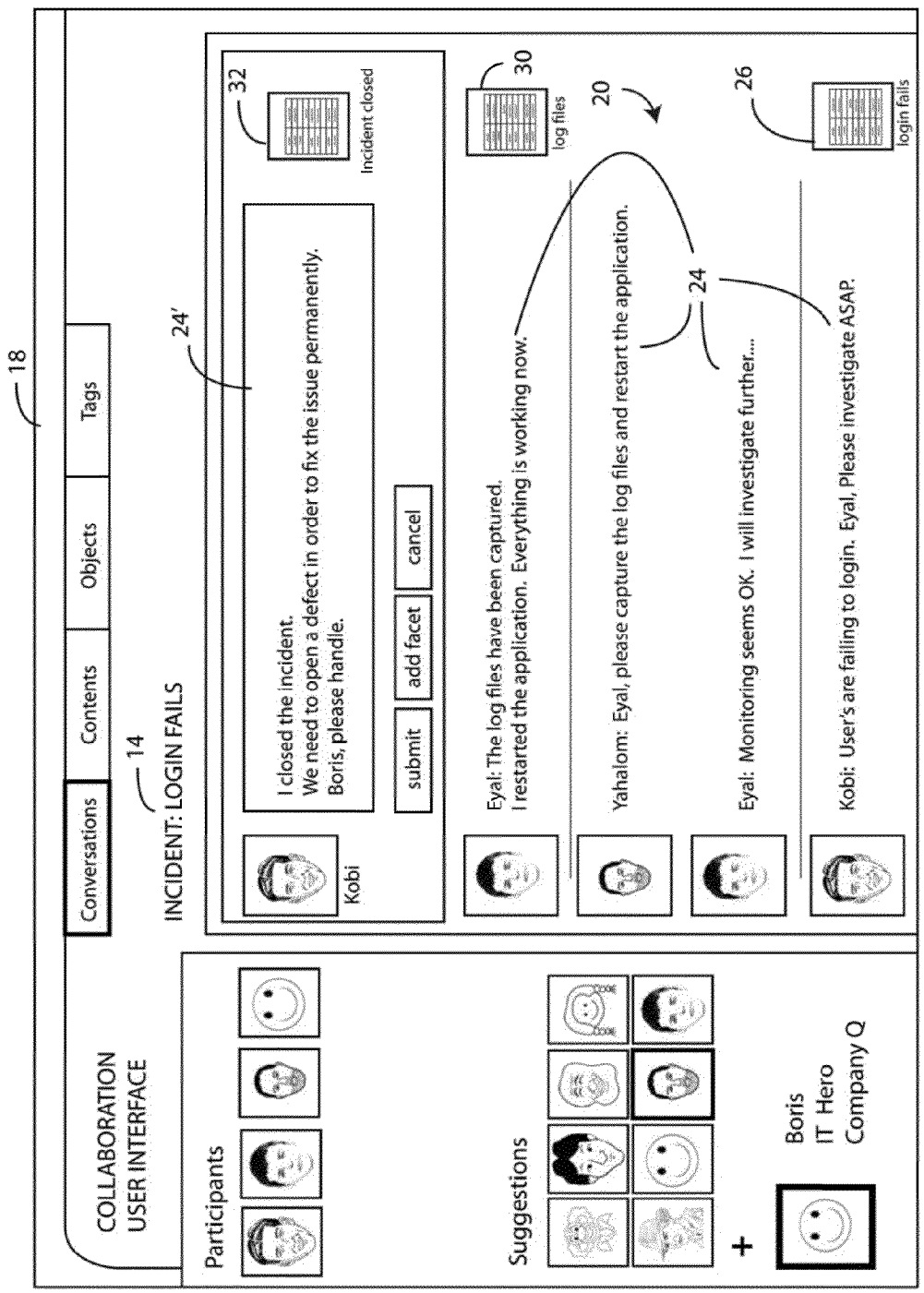
Figure 5:
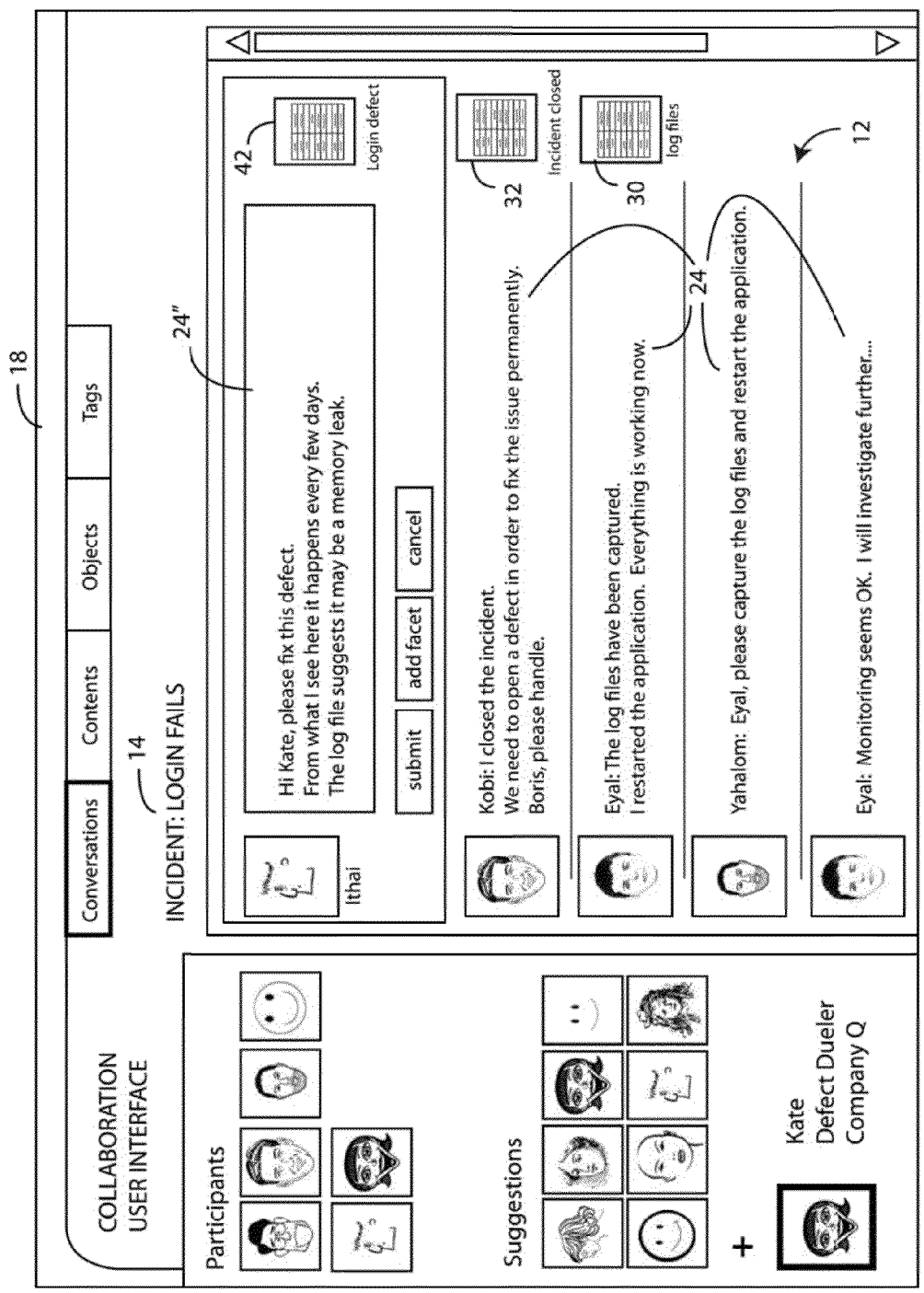

FIGS. 1-5 depict screen views of various user interfaces presenting an example in which a conversation is extended from one application to another. FIG. 1 depicts a screen view of a user interface for an incident management application. FIGS. 2 and 3 depict screen views of a user interface of a conversation being held in the context of a given incident being managed by the incident management application. FIG. 4 depicts a screen view of a user interface for a defect management application where the incident of FIG. 1 has translated into a defect. FIG. 5 depicts a screen view of a user interface of a later instance of the conversation being held in the context of a given defect being managed by the defect management application.

Looking at FIG. 1, screen view 10 is of an IT incident manager user interface. The interface includes list 12 of selectable incidents (application objects). Here, incident 14 is selected. The interface also includes control 16, that when selected, causes a conversation call to be made to a collaboration service. The call includes data identifying the particular user and data identifying incident 14.

FIG. 2 depicts screen view 18 of a collaboration service user interface generated in response to the selection of control 16 in FIG. 1. In the example of FIG. 2, screen view 18 is shown to include conversation 20 on topic 22. Topic 22 corresponds to incident 14 of FIG. 1. Conversation 20 includes an initiating post 24 from a participant—the user of the IT incident manager of FIG. 1. Facet 26 is displayed in conjunction with conversation 20. Facet 26, in this example, is a thumbnail representation or an icon representing the facet that when selected by a participant or viewer of conversation 20 causes the full facet 28 to be displayed. Both the thumbnail or icon facet and the full facet are facets as that term is used herein. Incident 14 of FIG. 1 can be referred to as an application object, that is, an object of the IT incident manager. Displayed facets 26, 28 are of that application object and thus provide application context to conversation 20.

In FIG. 3, conversation 20 has grown to include posts 24 from a number of participants including the original post 24 of FIG. 1, and post 24' currently being added to conversation 20. In the example of FIG. 3, facet 26 appears adjacent to the original post 24, facet 30 appears adjacent to a subsequent post 24, and facet 32 appears adjacent post 24'. In particular, facet 26 is of an application object defined by the original post 24 presented in FIG. 2. Facet 30 is of an application object corresponding to the subsequent post 24, and facet 32 is of an application object corresponding to the post being currently added. Thus, conversation 20 can include facets of multiple application objects that provide an evolving application context to conversation 20.

In the examples of FIGS. 1-3, conversation 20 is being held in the context of a particular application—the IT incident manager. As alluded to above, the particular incident being collaborated on may extend to another application. In FIG. 4, that application is an IT defect manager whose user interface is depicted in screen view 34. The interface includes list 36 of selectable defects. Here, defect 38 is selected. Defect 38 corresponds to incident 14 of FIG. 1 and the context of conversation 20 of FIGS. 2 and 3. The interface also includes control 40, that when selected, causes a call to be made to the collaboration service. The call includes data identifying the particular user, data identifying defect 38, and data identifying incident 14.

FIG. 5 depicts screen view 18 of the collaboration service user interface generated in response to the selection of control 40 in FIG. 4. In the example of FIG. 5, screen view 18 is shown to include conversation 20 on topic 22. Topic 22 corresponds to incident 14 of FIG. 2 and now defect 38 of FIG. 4. Conversation 20 has grown to include post 24" from a new participant—the user of the IT defect manager of FIG. 4. In the example of FIG. 5, facet 42 now appears adjacent to post 24". Facet 42 is of an application object defined by post 24". In this example, that application object is defect 38. Thus, conversation 20 extends across multiple applications.

Environment

Figure 6:
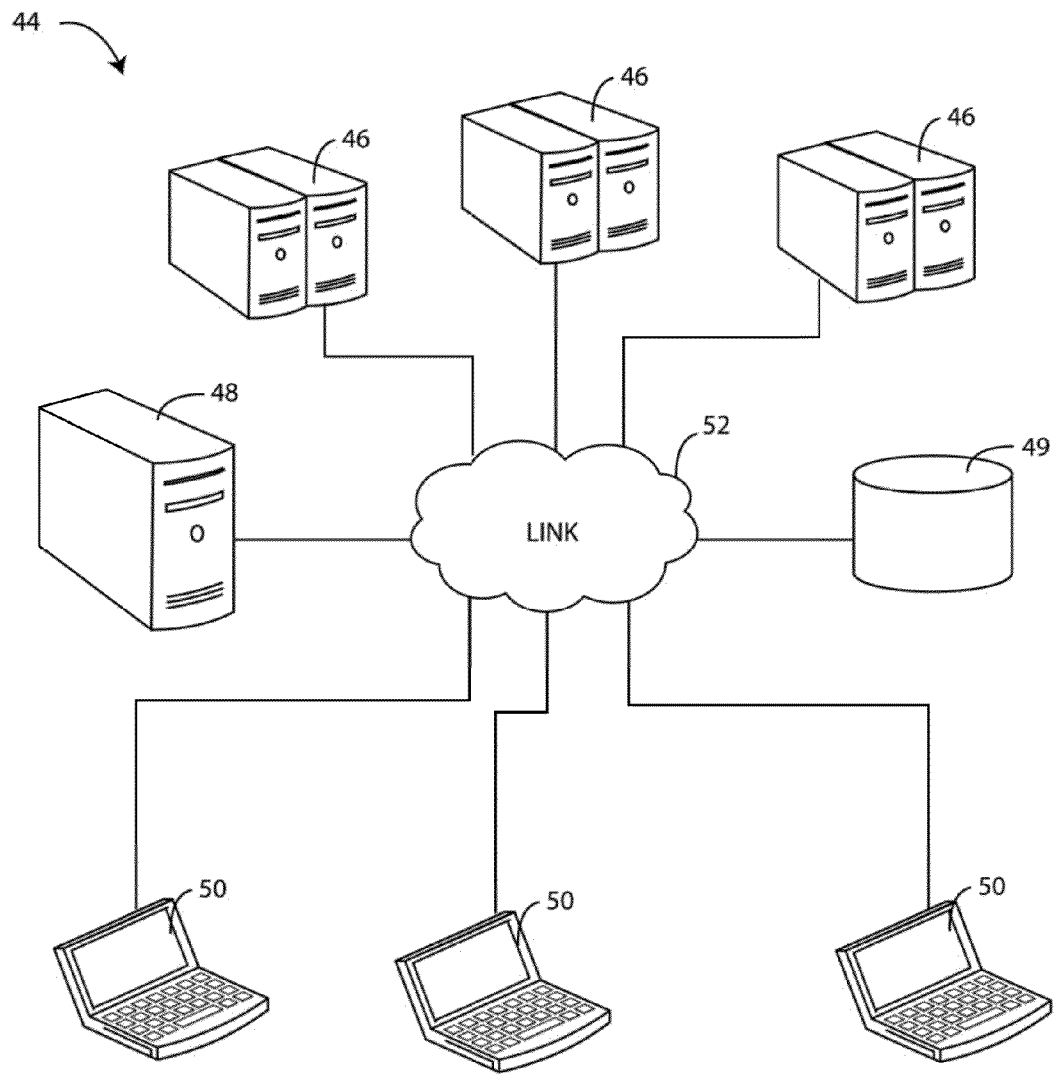
FIG. 6 depicts an environment in which various embodiments may be implemented.

FIG. 6 depicts an environment 44 in which various embodiments may be implemented. Environment 44 is shown to include application services 46, collaboration service 48, data store 49, and client devices 50. Application services 46 each represent a computing device or combination of computing devices configured to serve an application to client devices 50. Examples can include enterprise and consumer web and cloud applications provided through service oriented architectures.

Collaboration service 48 represents a computing device or combination of computing devices configured to serve a collaboration application to client devices 50. The collaboration application allows users to post to conversations in the context of application objects of applications served by services 46. Collaboration service 48 is configured to associate conversations with application objects, that is, objects managed by application services 46. In particular, collaboration service 48 is responsible for associating any given conversation with application objects from multiple applications. The conversation, for example, may by conducted by participants utilizing client devices 50. Collaboration service 48 is further configured, in this example, to obtain facets of the associated application objects and to update corresponding conversations to include those facets. Collaboration service 48 is also responsible for causing a user interface on a client device 50 to display a selected or identified conversation such that the conversation's facets are displayed in conjunction with its posts.

Data store 49 represents generally any device or combination of devices configured to provide electronic storage that can be accessed by collaboration service 48. In particular, data store 49 represents a repository for conversations created and updated by collaboration service 48. While shown separate, data store 49 may be an integral component of collaboration service 48, an application service 46, or even a client device 50. Data store 49 provides a central repository for storing conversations from which a given conversation can be identified, caused to be displayed in a user interface, and updated as desired.

Client devices 50 each represent a computing device configured to interact with application services 46 and collaboration service 48. Such interaction may be through a browser or other application executing on a given client device 50. Link 52 represents generally one or more of a cable, wireless, fiber optic, or remote connections via a telecommunication link, an infrared link, a radio frequency link, or any other connectors or systems that provide electronic communication. Link 52 may include, at least in part, an intranet, the Internet, or a combination of both. Link 52 may also include intermediate proxies, routers, switches, load balancers, and the like.

Components

Figure 7:
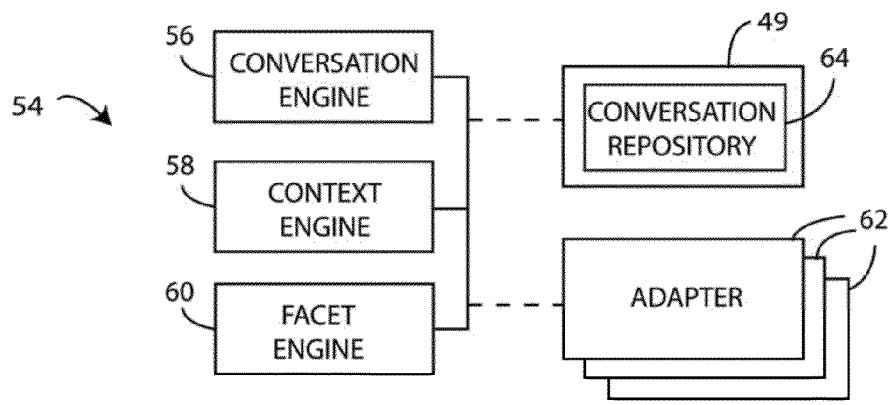
FIG. 7 depicts a system according to an example.
Figure 8:
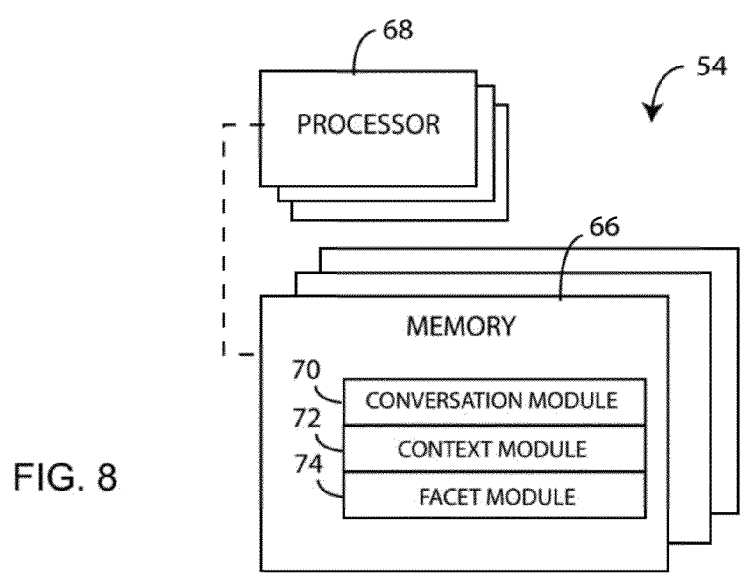
FIG. 8 is a block diagram depicting a memory and a processor according to an example.
Figure 9:
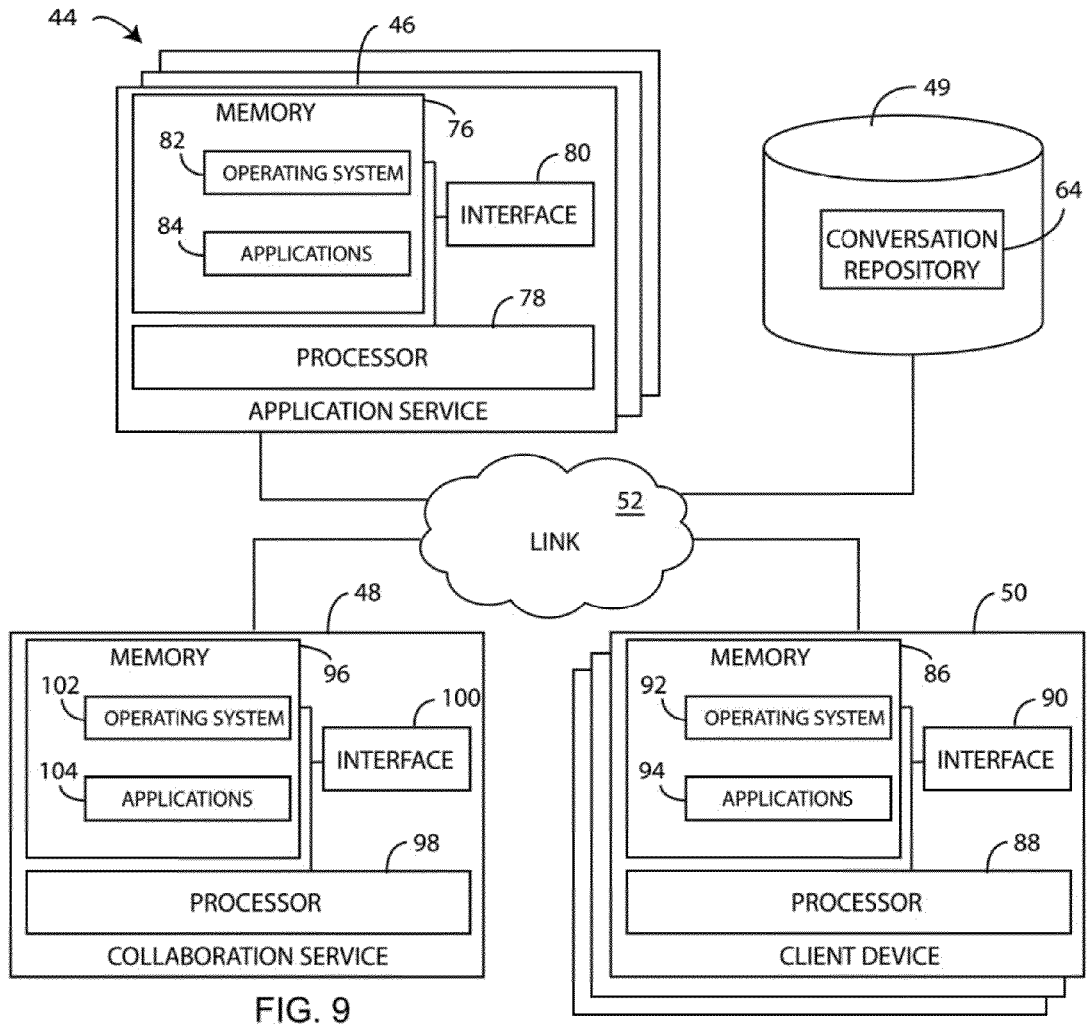
FIG. 9 is a block diagram depicting an implementation of the system of FIG. 7.

FIGS. 7-9 depict examples of physical and logical components for implementing various embodiments. FIG. 7 depicts collaboration system 54 for extending conversation context across multiple applications. In the example of FIG. 7, system 54 includes conversation engine 56, context engine 58, and facet engine 60. While system 54 is shown and discussed below to include engines 56, 58, and 60, it may also include or otherwise interact with adapters 62 and conversation repository 64.

Each adapter 62 is assigned to a source application from which a facet of an application object managed by that source application can be obtained. As will be discussed in more detail, each adapter 64 represents a combination of hardware and programming configured to, in response to a request, obtain facet data from the adapter's associated source application and return one of the facet data and a facet presentation assembled from the facet data. A facet presentation is electronic data in a format that is ready to be presented as part of a user interface. For example, a facet presentation may take the form of an HTML file and any accompanying data. Referring back to FIG. 2 as an example, a facet presentation may be for a thumbnail facet display such as facet 26, for a full facet display such as facet 28, or both. Facet data is electronic data that can be processed (into an HTML file for example) and then presented as part of a user interface as, for example, a thumbnail or full facet display, or both. Thus, a facet can include one or both of facet data and a facet presentation. In any case, the facet data or facet presentation contains electronic data indicative of an object of the corresponding application.

Conversation repository 64 represents memory storage configured to store conversations for a plurality of applications. Conversation repository 64 provides a central source in which those conversations can be created, accessed, and updated. A conversation started in the context of one application can be accessed from repository 64 and continued with respect to a second application. Conversation engine 56 represents generally any combination of hardware and programming configured to create, access, and update conversations in repository 64. Conversation engine 56 is responsible for serving in interface that when displayed presents an identified conversation for viewing and updating by the participants. In particular, conversation engine 56 is responsible for receiving a conversation call from an application with respect to a given object of that application, retrieve a conversation in repository 64 associated with that object, and cause a user interface to display the identified conversation so that it may be read and, if appropriate, updated with a new post and facet.

Context engine 58 represents generally any combination of hardware and programming configured to associate a conversation with an application object. In particular, context engine 58 is responsible for associating a conversation with application objects of multiple applications. In making such an association, context engine 58 may link a given conversation to an identifier of the application object with which the conversation is to be associated. The link, for example, may be accomplished by updating the conversation itself to include the identifier or by updating a table in conversation repository 64 or elsewhere with entries linking the application object identifier to an identifier for the conversation in question.

Context engine 58 is also responsible for identifying a conversation in conversation repository 64 having a context that is relevant to an application object of an application making a conversation call to conversation engine 56. To identify the conversation, context engine 58 may use an application object identifier included in the conversation call. Where the conversation is being extended from a first application to a second application, the conversation call may also include an application object identifier for an application object of that second application. Here, the first application may have obtained the identifier from the second application and included it in the conversation call to conversation engine 56. The identified conversation, in this case, may include a post and facet relevant to the application object of the second application.

Context engine 58 may pass data identifying the application object of an application making the conversation call on to facet engine 60. Facet engine 60 represents generally any combination of hardware and programming configured to obtain facets of the application objects associated with the conversation. Facet engine 60 is also responsible for updating a corresponding conversation to include an obtained facet. In performance of its functions, facet engine 60 may maintain a mapping of application objects or object types to their corresponding adapters 62. Facet engine 60 communicates a request for the facet to an adapter 62 mapped to the application object in question. That request may include data identifying the application object. In response, facet engine 60 may receive a list of facets supported by the adapter 62 for that application object. Facet engine 60 can then return a request to adapter 62 for a selected one of the facets.

Ultimately, facet data, a facet presentation, or both are returned from one or more adapters 62 and used to update the corresponding conversation to include the given facet. Where facet data is received, facet engine 60 processes the facet data to generate a default facet presentation. Facet engine 60 then updates the conversation to include the obtained facet presentation or the default facet presentation as the case may be.

The engines of collaboration system 54, thus, are configured to provide a conversation repository 64 for storing a plurality of conversations for a plurality of applications. The provision may be accomplished by storing those conversations in a central repository such repository 64. Context engine 58 is configured to identifying a conversation in the conversation repository having a context that is relevant to a first application object of a first application of that plurality in response to a conversation call from a second application of that plurality. Conversation engine 56 is then responsible for causing a user interface to display the identified conversation. Such may be accomplished by communicating a web page or other electronic file with at least implicit instructions that it be presented for viewing by a user.

A conversation identified by context engine 58 may include a post relevant to the first application object as well as a facet of the object. The interface caused to display the identified conversation will then present that post and facet. Conversation engine 56 may update the conversation in repository 64 with additional posts relevant to a second application object of the second application. Facet engine 60 can be enlisted to update the conversation to include a facet of that second application object. Context engine 58 can then update the conversation's associations such that it is associated with the first application object and the second application object and is identifiable within conversation repository 64 based on either or both associations.

The conversation call from the second application may include data such as an application identifier that identifies the first application object. Using that data as a search term, context engine 58 may perform its function by querying conversation repository 64. As the conversation can be associated with the application object via data such as the identifier, the query results will identify the conversation. Context engine 58 may instead query using data obtained from a user of the second application that made the conversation call. Such may be a free text search querying conversation repository 64 for relevant conversations from which the user can select.

In foregoing discussion, various components were described as combinations of hardware and programming. Such components may be implemented in a number of fashions. Looking at FIG. 8, the programming may be processor executable instructions stored on tangible memory media 66 and the hardware may include a processor or processors 68 for executing those instructions. Memory 66 can be said to store program instructions that when executed by processor 68 implement context system 54 of FIG. 7. Memory 66 may be integrated in the same device as processor 68 or it may be separate but accessible to that device and processor 68.

In one example, the program instructions can be part of an installation package that when installed can be executed by processor 58 to implement context system 54. In this case, memory 66 may be a portable medium such as a CD, DVD, or flash drive or a memory maintained by a server from which the installation package can be downloaded and installed. In another example, the program instructions may be part of an application or applications already installed. Here, memory 66 can include integrated memory such as a hard drive, solid state drive, or the like.

In FIG. 8, the executable program instructions stored in memory 66 are depicted as conversation module 70, context module 72, and facet module 74. Conversation module 70 represents program instructions that when executed cause process 68 to implement conversation engine 56 of FIG. 7. Context module 72 represents program instructions that when executed cause the implementation of context engine 58. Likewise, facet module 74 represents program instructions that when executed cause the implementation of facet engine 60. While not shown, memory 66 may also include adapter modules corresponding to adapters 62.

As a further example, FIG. 9 depicts a block diagram of environment 44 where system 54 of FIG. 7 may be implemented by any combination of application service 46, collaboration service 48, and client device 50. In the example of FIG. 9, application service 46 is shown to include memory 76, processor 78, and interface 80. Processor 78 represents generally any processor configured to execute program instructions stored in memory 76 to perform various specified functions. Interface 80 represents generally any interface enabling application service 46 to communicate via link 52 with client device 50 and collaboration service 48. Memory 76 is shown to include operating system 82 and applications 84. Operating system 82 represents a collection of programs that when executed by processor 78 serve as a platform on which applications 84 can run. Applications 84 represent program instructions that when executed by processor 78 can be served to client device 50.

Client device 50 is shown to include memory 86, processor 88, and interface 90. Processor 88 represents generally any processor configured to execute program instructions stored in memory 86 to perform various specified functions. Interface 90 represents generally any interface enabling client device 50 to communicate via link 52 with application service 48 and collaboration service 48. Memory 86 is shown to include operating system 92 and applications 94. Operating system 92 represents a collection of programs that when executed by processor 88 serve as a platform on which applications 84 can run. Applications 96 represent program instructions that when executed by processor 88 can consume applications served by application service 46 and collaboration service 48. Applications 94, for example, may include a web browser.

Collaboration service 48 is shown to include memory 96, processor 98, and interface 100. Processor 98 represents generally any processor configured to execute program instructions stored in memory 96 to perform various specified functions. Interface 100 represents generally any interface enabling collaboration service 48 to communicate via link 52 with application service 46 and client device 50. Memory 96 is shown to include operating system 102 and applications 104. Operating system 102 represents a collection of programs that when executed by processor 98 serve as a platform on which applications 104 can run. Applications 104 represent program instructions that when executed by processor 98 function serve a collaboration service to client device 50. In particular, the program instructions, when executed, may function as collaboration system 54 FIG. 7.

Looking at FIG. 7, conversation engine 56, context engine 58, facet engine 60, and adapters 62 are described as combinations of hardware and programming. The hardware portions may, depending on the embodiment, be implemented as one or more of processors 78, 88, and 98 of FIG. 9. The programming portions, depending on the embodiment, can be implemented by one or more of operating systems 82, 92, and 102, one or more of applications 84, 94, and 104, or combinations thereof. In one example, system 54 of FIG. 7 may be implemented by processor 98 executing program instructions represented by applications 104. Where system 54 includes adapters 62 (FIG. 7), adapters 64 may be implemented by collaboration service 48, application service 46, or client device 50. System 54 may be distributed in other fashions across application service 46, client device 50, and collaboration service 48. Moreover, any two or all three of collaboration service 48, application service 46, and client device 50 may be integrated into a common service.

Operation

Figure 10:
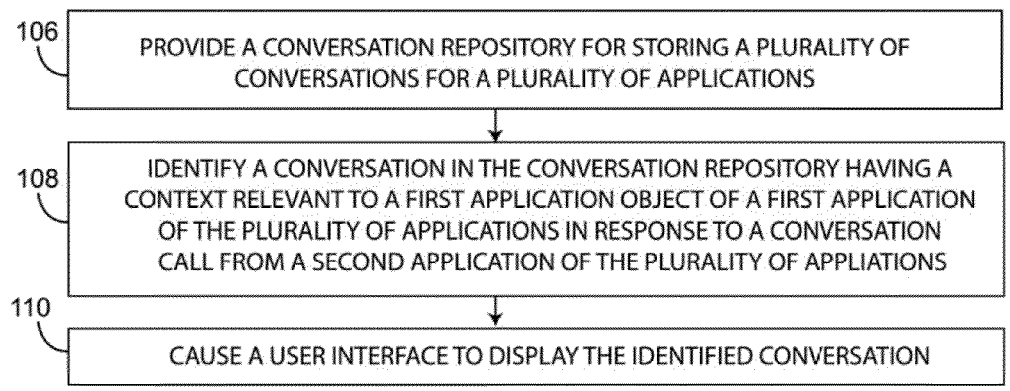
FIG. 10 is a flow diagram depicting steps taken to implement an example.

FIG. 10 is a flow diagram of steps taken to implement a method for extending conversation context across applications. In discussing FIG. 10, reference may be made to the diagrams of FIGS. 1-9 to provide contextual examples. Implementation, however, is not limited to those examples. A conversation repository is provided for storing a plurality of conversations for a plurality of applications (step 106). Referring to FIG. 7, conversation repository 64 is an example of such a repository. The provision may be accomplished by storing those conversations in a central repository such as data store 49 in such a manner that a selected conversation can be identified within the repository. For example, a given conversation may be associated with data identifying an application object of a given application. The association may be accomplished by including the data within each conversation or in an index for the conversations. That data, for example, may be an object identifier that can be used as a search term in a query searching for a conversation in the repository. In another example, the conversation repository may be searchable via a natural language search using search terms provided or otherwise defined by a user.

A conversation in the repository provided in step 106 is identified as being relevant to a first application object of a first application of the plurality (Step 108). Step 108 is performed in response to receiving a conversation call from a second application. Referring to FIG. 7, context engine 58 may be responsible for implementing step 108. It may do so using data included in that conversation call. In an example, the data may include an identifier for the first application object. The first application may have provided the identifier to the second application. Context engine 58 can use the identifier as a search term for querying the conversation repository. It is also noted that context engine 58 may implement step 58 via a natural language query with user specified search terms.

A user interface is caused to display the conversation identified in step 108 (step 110). Referring to FIG. 7, conversation engine 56 may be responsible for implementing step 110 and may do so by communicating electronic data to a client with at least implicit instructions that the data be processed to cause a display of the conversation. Screen display 18 of FIG. 5 depicts an example of such a display. Conversation 12 in FIG. 5 is relevant to a first application is relevant to an incident manager (a first application). Conversation 12 was identified using an incident indenter (data identifying a first application object) following a conversation call from a defect manager (the second application).

The conversation identified in step 108 may include a post relevant to the first application object as well as a facet of that application object. Step 110 then includes causing the user interface to display the conversation including the post and the facet. Doing so provides application context to the conversation for the first application that may be relevant to a user of the second application that made the conversation call.

The identified conversation may then be updated to include a post relevant to a second application object of the second application as well as a facet of that second application. Referring to FIG. 7, conversation engine 56 may add a post to the conversation based upon user input received following the display of the conversation in step 110. That user input may also be passed to facet engine 60 which in turn adds an identified facet to the conversation. Ultimately, context engine 58 ensures that the updated conversation is associated with the second application object as well as the first application object. At this point, the updated conversation has application context for the first and second applications, is associated with data identifying the first and second application objects, and is identifiable within the conversation repository based one either or both application object associations.

Figure 11:
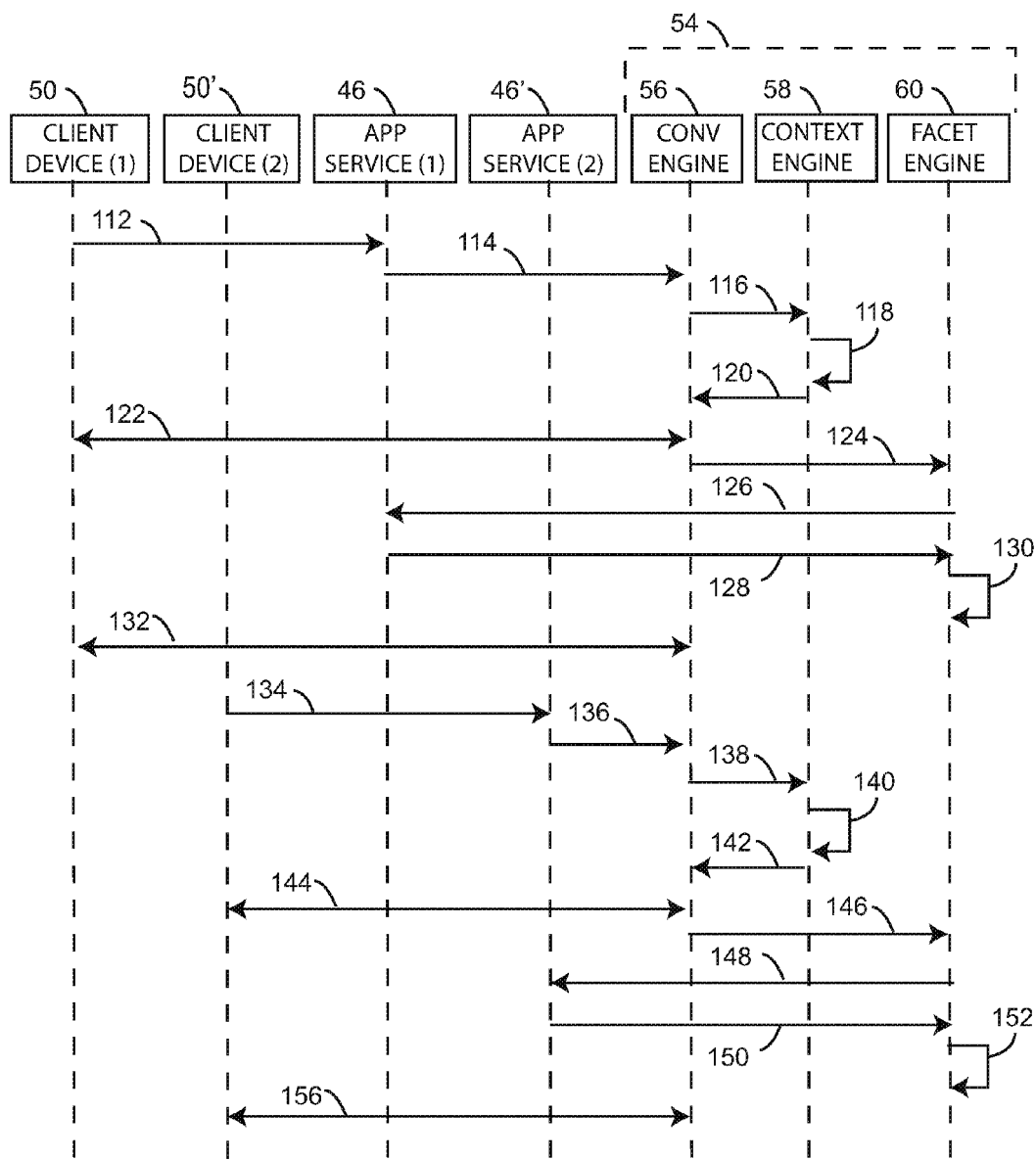
FIG. 11 is a communication sequence diagrams according to an example.

FIG. 11 is a communication sequence diagram of actions taken with respect to system 54 of FIG. 7 in environment 44 of FIGS. 6 and 9. More specifically, FIG. 11 depicts steps taken to extend a conversation across applications. Initially, a first client device 50 interacts with a first application service 46 (step 112) and causes the first application service 46 to make a first call to collaboration system 54 (step 114). In the call, the first application service 46 includes data identifying a first application object with which the user of the first application had been interacting or otherwise identified. Conversation engine 56 of system 54 receives the conversation call and passes the data identifying the first application object on to context engine 58 (step 116). Context engine 58 queries a conversation repository to identify an existing conversation that is relevant to the first application object (Step 118). Context engine 58 informs conversation engine 56 of the existence or nonexistence of such a conversation (step 120).

Conversation engine 56 interacts with the first client device (Step 122). If available, conversation engine 56 returns the existing conversation in step 122 to the first client device 50 so that it can be displayed as part of a user interface. If not available, conversation engine 56 establishes a new conversation in the conversation repository and returns that conversation. Context engine 58 associates that new conversation with the first application object. The interaction of step 122 can also include the first client device 50 communicating a user post to the conversation as well as data indicating that a facet of the first application object is to be added. Conversation engine 56 updates the conversation with the post and passes any facet related instructions on to facet engine 60 (step 124).

Utilizing the facet related instructions, facet engine 60 and sends a request for a first facet to the first application service 46 (step 126). First application service 46 returns the requested facet (step 128). As explained above, the data returned in step 128 may include facet data, a facet presentation, or both. Using the returned data, facet engine 60 updates the conversation to include the facet so that it can be displayed in conjunction with a given post (step 130). Conversation engine 56 interacts with the first client device 50 causing the updated conversation to be displayed (Step 132). At this point the updated conversation is associated with the first application object and includes a post and facet relevant to that object and the first application.

Later, a second client device 50' interacts with a second application service 46' (step 134) and causes the second application service 46 to make a second call to collaboration system 54 (step 134). In the call, the second application service 46 includes data identifying a second application object with which the user of the second application had been interacting or otherwise identified. That data also identifies the first application object. Referring back to FIG. 4 as an example, the data passed when the user selected the collaborate control 40 to make the conversation call included data identifying a particular defect (the second application object) as well as data identifying a given incident (the first application object) that led to the defect.

Conversation engine 56 of system 54 receives the second conversation call and passes the data identifying the first and second application objects on to context engine 58 (step 138). Context engine 58 queries a conversation repository to identify an existing conversation that is relevant to the first application object (Step 140). Context engine 58 updates the conversation such that it is associated also with the second application object and informs conversation engine 56 of the existence of that conversation (step 142).

Conversation engine 56 interacts with the second client device (Step 144) returning the conversation identified in step 140 to the second client device 50' so that it can be displayed as part of a user interface thus extending the conversation from a first application to a second. The interaction of step 144 can also include the second client device 50' communicating a user post to the conversation as well as data indicating that a facet of the second application object is to be added. Conversation engine 56 updates the conversation with the post and passes any facet related instructions on to facet engine 60 (step 146).

Utilizing the facet related instructions, facet engine 60 sends a request for a second facet to the second application service 46' (step 148). Second application service 46' returns the requested facet (step 150). As explained above, the data returned in step 150 may include facet data, a facet presentation, or both. Using the returned data, facet engine 60 updates the conversation to include the second facet so that it can be displayed in conjunction with a given post (step 152). Conversation engine 56 interacts with the second client device 50' causing the updated conversation to be displayed (Step 154). At this point the updated conversation is associated with the first and second application objects and includes posts and facets relevant to those objects.

Conclusion

FIGS. 1-5 depict example screen views of various user interfaces. The particular layouts and designs of those user interfaces are examples only and intended to depict a sample workflow in which conversation context is extended across applications. FIGS. 6-9 aid in depicting the architecture, functionality, and operation of various embodiments. In particular, FIGS. 7-9 depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Embodiments can be realized in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical, non-transitory media such as, for example, electronic, magnetic, optical, electromagnetic, or semiconductor media. More specific examples of suitable computer-readable media include, but are not limited to, a portable magnetic computer diskette such as floppy diskettes, hard drives, solid state drives, random access memory (RAM), read-only memory (ROM), erasable programmable read-only memory, flash drives, and portable compact discs.

Although the flow diagram of FIG. 10 and the communication sequence diagram of FIG. 11 show specific orders of execution, the orders of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A method for extending a conversation across applications, comprising:
    providing a conversation repository for storing a plurality of conversations for a plurality of applications;
    identifying a conversation in the conversation repository having a context that is relevant to a first application object of a first application of the plurality of applications in response to a conversation call from a second application of the plurality of applications; and
    causing a user interface to display the identified conversation.

2. The method of claim 1, wherein the identified conversation includes a post relevant to the first application object a facet of the first application object and causing comprises causing the user interface to display the conversation including the post and the facet.

3. The method of claim 2, comprising updating the identified conversation to include a post relevant to the second application object and a facet of the second application object such that the that the updated conversation is associated with the first application object and the second application object and is identifiable within the conversation repository based on either or both associations.

4. The method of claim 1, wherein identifying comprises querying the conversation repository using data obtained from a user of the second application as a search term, the search term identifying the first application object.

5. The method of claim 1, wherein
    providing comprises providing a conversation repository for storing conversations for the plurality of applications such that each conversation is associated with an identifier for an application object of one of the plurality of applications;
    identifying comprises querying the conversation repository using an application object identifier for the first application object, the object identifier being included in the conversation call.

6. A system for extending a conversation across applications, the system comprising a conversation engine and a context engine, wherein:
    the conversation engine is configured to receive conversation calls from a plurality of applications;
    the context engine is configured to identify a conversation in a conversation repository having a context that is relevant to a first application object of a first application of the plurality of applications in response to the conversation engine receiving a conversation call from a second application of the plurality of applications; and
    the conversation engine is configured to cause a user interface to display the identified conversation.

7. The system of claim 6, wherein the identified conversation includes a post relevant to the first application object a facet of the first application object and the conversation engine is configured to cause the user interface to display the conversation including the post and the facet.

8. The system of claim 7, comprising a facet engine and wherein:
    the conversation engine is configured to update the identified conversation to include a post relevant to the second application object;
    the facet engine is configured to update the identified conversation with a facet of the second application object; and
    the context engine is configured to associate the identified conversation with the first application object and the second application object so that the identified conversation is identifiable within the conversation repository based on either or both associations.

9. The system of claim 6, wherein the context engine is configured to identify the conversation by querying the conversation repository using data obtained from a user of the second application as a search term, the search term identifying the first application object.

10. The system of claim 6, wherein:
    the conversation repository stores a plurality of conversations each associated with an application object of one of a plurality of applications;
    the conversation engine is configured to receive an object identifier for the first application in the conversation call from the second application; and
    the context engine is configured to identify the conversation by querying the conversation repository using the application object identifier for the first application object received by the conversation engine.

11. A computer readable medium having instructions that when executed by a processor implement a system for extending a conversation across applications, the system comprising a conversation engine and a context engine, wherein:

the conversation engine is configured to receive conversation calls from a plurality of applications;

the context engine is configured to identify a conversation in a conversation repository having a context that is relevant to a first application object of a first application of the plurality of applications in response to the conversation engine receiving a conversation call from a second application of the plurality of applications; and the conversation engine is configured to cause a user interface to display the identified conversation.

12. The medium of claim 11, wherein the identified conversation includes a post relevant to the first application object a facet of the first application object and the conversation engine is configured to cause the user interface to display the conversation including the post and the facet.

13. The medium of claim 12, wherein:

the system includes a facet engine;

the conversation engine is configured to update the identified conversation to include a post relevant to the second application object;

the facet engine is configured to update the identified conversation with a facet of the second application object; and the context engine is configured to associate the identified conversation with the first application object and the second application object so that the identified conversation is identifiable within the conversation repository based on either or both associations.

14. The medium of claim 11, wherein the context engine is configured to identify the conversation by querying the conversation repository using data obtained from a user of the second application as a search term, the search term identifying the first application object.

15. The medium of claim 14, wherein:

the conversation repository stores a plurality of conversations each associated with an application object of one of a plurality of applications;

the conversation engine is configured to receive an object identifier for the first application in the conversation call from the second application; and the context engine is configured to identify the conversation by querying the conversation repository using the application object identifier for the first application object received by the conversation engine.

* * * * *